(12) United States Patent
Liu et al.

(10) Patent No.: US 11,697,227 B2
(45) Date of Patent: Jul. 11, 2023

(54) FOAMING AND DYEING INTEGRATED PRODUCTION LINE FOR POLYMER MATERIAL PRODUCT, AND METHOD THEREOF

(71) Applicant: GUANGZHOU GREEN AND HEALTH BIOTECH CO., LTD., Guangzhou (CN)

(72) Inventors: Hancha Liu, Guangzhou (CN); Yuan Liang, Guangzhou (CN); Shuhua Wu, Guangzhou (CN); Jianyu Xu, Guangzhou (CN); Guohang Yang, Guangzhou (CN); Jitao Xu, Guangzhou (CN); Jiaqi Liang, Guangzhou (CN); Yuehua Liu, Guangzhou (CN); Yuhao Chen, Guangzhou (CN)

(73) Assignee: GUANGZHOU GREEN AND HEALTH BIOTECH CO., LTD., Guangzhou (CN)

( * ) Notice: Subject to any disclaimer, the term of this patent is extended or adjusted under 35 U.S.C. 154(b) by 159 days.

(21) Appl. No.: 17/016,400

(22) Filed: Sep. 10, 2020

(65) Prior Publication Data
US 2022/0072744 A1 Mar. 10, 2022

(51) Int. Cl.
| | |
|---|---|
| *B29C 44/02* | (2006.01) |
| *B29C 67/00* | (2017.01) |
| *B29C 44/42* | (2006.01) |
| *B29K 105/04* | (2006.01) |
| *B29K 105/00* | (2006.01) |

(52) U.S. Cl.
CPC ............ *B29C 44/02* (2013.01); *B29C 44/424* (2013.01); *B29C 67/0007* (2013.01); *B29K 2105/0032* (2013.01); *B29K 2105/04* (2013.01)

(58) Field of Classification Search
CPC ... B29C 44/02; B29C 44/424; B29C 67/0007; B29C 44/348; B29K 2105/0032; B29K 2105/04; C08J 9/12; C08J 9/122; C08J 9/149; C08J 2203/06; C08J 2203/08; D06P 1/94; B29D 35/122
USPC .......................................................... 264/50
See application file for complete search history.

(56) References Cited

U.S. PATENT DOCUMENTS

| | | | |
|---|---|---|---|
| 5,340,614 A * | 8/1994 | Perman ................ | A61L 17/005 427/430.1 |
| 5,508,060 A * | 4/1996 | Perman .................. | C08J 7/065 427/2.24 |
| 6,598,252 B2 * | 7/2003 | Woerlee ................ | B01F 21/20 68/17 R |

(Continued)

*Primary Examiner* — Jeffrey M Wollschlager
*Assistant Examiner* — Xue H Liu

(57) ABSTRACT

The present invention discloses a foaming and dyeing integrated production line for a polymer material product, and a method thereof. The production line comprises a foaming and dyeing kettle, a pressure control module, a dye separation module, a fluid liquefaction and storage module, a fluid pressurization delivery module, a fluid heating module and a dyeing circulation module. The production line integrates the functions of one-step foaming and supercritical fluid dyeing of polymer material, thereby being simple in structure, comprehensive in function, convenient to operate, high in production efficiency, good in product quality and low in cost; besides, the production line can carry out both dyeing and foaming operations, only foaming operation or only dyeing operation on polymer material.

10 Claims, 3 Drawing Sheets

(56) References Cited

U.S. PATENT DOCUMENTS

| | | | | |
|---|---|---|---|---|
| 10,876,252 | B2* | 12/2020 | Bohmer | D06P 3/24 |
| 2011/0138547 | A1* | 6/2011 | Fernandez Cid | D06P 1/94 |
| | | | | 8/475 |
| 2014/0259329 | A1* | 9/2014 | Watkins | B29C 37/0025 |
| | | | | 264/492 |
| 2018/0119324 | A1* | 5/2018 | Long | B01D 46/71 |
| 2018/0290348 | A1* | 10/2018 | Su | D01F 1/08 |
| 2018/0371664 | A1* | 12/2018 | Zheng | D06B 19/00 |
| 2020/0002499 | A1* | 1/2020 | Luo | B29C 44/3453 |
| 2020/0063338 | A1* | 2/2020 | Bohmer | D06P 1/16 |
| 2022/0072530 | A1* | 3/2022 | Liu | B01J 3/042 |
| 2022/0072745 | A1* | 3/2022 | Liu | B29C 44/3403 |
| 2022/0072746 | A1* | 3/2022 | Liu | B01J 3/03 |

* cited by examiner

FOAMING AND DYEING INTEGRATED PRODUCTION LINE FOR POLYMER MATERIAL PRODUCT, AND METHOD THEREOF

TECHNICAL FIELD

The present invention relates to the technical field of supercritical fluid foaming and dyeing processing of polymer material, in particular to a foaming and dyeing integrated production line for a polymer material product, and a method thereof.

BACKGROUND

Chinese invention patent CN 109385058 discloses a method for preparing a foamed product of a moldless three-dimensional structure by means of a supercritical fluid, comprising a supercritical fluid delivery system, a three-dimensional foaming system and a preheating system; a polymer raw material is pressure-molded into a foamed preplastic; then the foamed preplastic is preheated in the preheating system; after the temperature is increased to a preheating temperature, the foamed preplastic is delivered into the three-dimensional foaming system; a supercritical fluid is then introduced; after the supercritical fluid completely swells and diffuses into the polymer, the pressure is released to obtain the foamed product. The foaming method only includes a foaming procedure and is not applicable when colored materials are required. Moreover, in the foaming procedure, foaming is carried out in the foaming system after the processing in the preheating system, so that it takes multiple operation steps and multiple system devices for carrying out the steps, thereby leading to prolonged production time and high cost; besides, applications for materials with multiple colors cannot be achieved.

SUMMARY

An object of the present invention is to overcome the defects in the prior art, and provides a foaming and dyeing integrated production line for a polymer material product, and a method thereof.

To achieve the above object, in a first aspect, provided is a foaming and dyeing integrated production line for a polymer material product, comprising a foaming and dyeing kettle for foaming and/or dyeing, a pressure control module for controlling operation pressure of the foaming and dyeing kettle, a dye separation module for separating $CO_2$ from dye remaining after dyeing, a fluid liquefaction and storage module for liquefying and storing $CO_2$, a fluid pressurization delivery module for pressurizing $CO_2$, a fluid heating module for heating $CO_2$, and a dyeing circulation module for circularly delivering dye in cooperation with $CO_2$ to the foaming and dyeing kettle for dyeing; the pressure control module is connected to a first fluid outlet of the foaming and dyeing kettle, the dye separation module is connected between the pressure control module and the fluid liquefaction and storage module, the fluid pressurization delivery module is connected between the fluid liquefaction and storage module and the fluid heating module, the fluid heating module is connected to both a fluid inlet of the foaming and dyeing kettle and the dyeing circulation module, and the dyeing circulation module is connected to both the fluid inlet of the foaming and dyeing kettle and a second fluid outlet of the foaming and dyeing kettle.

The foaming and dyeing kettle comprises a kettle body, a lid, an agitator driver and an agitator paddle, the kettle body is horizontally arranged, the lid is installed inside an open end of the kettle body in a sealed manner, the agitator driver is axially installed at a closed end of the kettle body, an agitator shaft of the agitator driver penetrates through the kettle body and extends into the kettle body, the agitator shaft is connected to the agitator paddle inside the kettle body, and the lid is locked and unlocked with the kettle body by means of a wedge-type quick-open locking mechanism.

The pressure control module comprises an automatic pressure regulator valve, a first switch valve is arranged between an inlet end of the automatic pressure regulator valve and the first fluid outlet of the foaming and dyeing kettle, and an outlet end of the automatic pressure regulator valve is connected to the dye separation module.

The dye separation module comprises an evaporator and a dye recovery and separation kettle, an inlet end of the evaporator is connected to the pressure control module, an outlet end of the evaporator is connected to an inlet end of the dye recovery and separation kettle, an outlet end of the dye recovery and separation kettle is connected to the fluid liquefaction and storage module, and a second switch valve is arranged at a recovery port of the dye recovery and separation kettle.

The fluid liquefaction and storage module comprises a condenser, a $CO_2$ circulating storage tank, a $CO_2$ replenishing storage tank and a $CO_2$ delivery pump, an inlet end of the condenser is connected to the dye separation module, an outlet end of the condenser is connected to an inlet end of the $CO_2$ circulating storage tank, an outlet end of the $CO_2$ circulating storage tank is connected to the fluid pressurization delivery module; the $CO_2$ delivery pump is connected between an outlet end of the $CO_2$ replenishing storage tank and a fluid replenishing port of the $CO_2$ circulating storage tank, and a third switch valve is arranged between the $CO_2$ delivery pump and the $CO_2$ replenishing storage tank.

The fluid pressurization delivery module comprises a $CO_2$ high-pressure pump, an inlet end of the $CO_2$ high-pressure pump is connected to an outlet end of the fluid liquefaction and storage module, and an outlet end of the $CO_2$ high-pressure pump is connected to the fluid heating module.

The fluid heating module comprises a heater, a fourth switch valve is arranged at an outlet end of the heater, and an outlet end of the fourth switch valve is connected to both the fluid inlet of the foaming and dyeing kettle and the dyeing circulation module.

The dyeing circulation module comprises a dyeing circulation pump and a dye kettle, a fifth switch valve is arranged between an outlet end of the dyeing circulation pump and a fluid inlet of the foaming and dyeing kettle, an outlet end of the dye kettle is connected to an inlet end of the dyeing circulation pump, and a sixth switch valve is arranged between an inlet end of the dye kettle and the second fluid outlet of the foaming and dyeing kettle.

The production line further comprises a $N_2$ supply module for providing $N_2$ during foaming operation, an outlet end of the $N_2$ supply module is connected between the fluid pressurization delivery module and the fluid heating module, the $N_2$ supply module comprises a $N_2$ storage tank, a $N_2$ high-pressure pump and a vaporizer, a seventh switch valve is arranged between an outlet end of the $N_2$ storage tank and an inlet end of the $N_2$ high-pressure pump, an inlet end of the vaporizer is connected to an outlet end of the $N_2$ high-pressure pump, and an outlet end of the vaporizer is connected between the fluid pressurization delivery module and the fluid heating module.

In a second aspect, provided is a foaming and dyeing integrated production method for a polymer material product, comprising the following steps of:

(1) material loading: putting a polymer material preform into a foaming and dyeing kettle, and loading dye for dyeing into a dyeing circulation module;

(2) supercritical fluid dyeing: gasifying $CO_2$ from a fluid liquefaction and storage module sequenctially through pressurization in a fluid pressurization delivery module and heating in a fluid heating module and injecting the $CO_2$ into the foaming and dyeing kettle, stopping pressurization when the $CO_2$ reaches a supercritical state meeting requirements of a dyeing process, then starting the dyeing circulation module to begin a dyeing circulation process in which the $CO_2$ in the supercritical state enters the dyeing circulation module and dissolves the dye in the dyeing circulation module, the $CO_2$ carrying the dye returns to the foaming and dyeing kettle to dye the polymer material preform in the foaming and dyeing kettle a desired color, when dyeing requirements are met, the $CO_2$ flows out of the foaming and dyeing kettle and is subjected to pressure release in a pressure control module, the $CO_2$ is separated from the dye remaining after dyeing in a dye separation module, and the $CO_2$ with the dye separated enters the fluid liquefaction and storage module to be liquefied and stored;

(3) one-step foaming: when the dyeing process is finished, injecting $CO_2$ and/or $N_2$ pressurized in the fluid pressurization delivery module and heated in the fluid heating module into the foaming and dyeing kettle according to a proportion of fluid required for foaming, and stopping pressurization and starting foaming operation when requirements of a foaming process are met; and (4) unloading: when the foaming process is finished, opening the foaming and dyeing kettle, and taking out a foamed and dyed polymer material product in the foaming and dyeing kettle.

The polymer material preform comprises a sheet, granular or three-dimensional object made of any one of polyethylene, polylactic acid, polypropylene, polystyrene, polymethyl methacrylate, polycarbonate, acrylonitrile-butadiene-styrene copolymer, polyethylene terephthalate, polyamide, polyimide, polyphenylene sulfide, polyether sulfone, polyether ether ketone, rubber, silicone rubber, ethylene propylene diene monomer, ethylene-vinyl acetate copolymer, thermoplastic polyurethane, thermoplastic elastomer, or a combination thereof.

The dye comprises any one of a disperse dye, an azoic dye, a cationic dye, a reactive dye, an acid dye, a condensation dye, or a combination of.

Depending on material of the polymer material product, temperatures for dyeing and foaming are individually controlled between 60° C. and 200° C., pressures for dyeing and foaming are individually controlled between 10 MPa and 35 MPa, and times for dyeing and foaming are individually controlled between 40 minutes and 180 minutes.

Compared with the prior art, the present invention has the beneficial effects that:

1. The production line of the invention integrates the functions of one-step foaming and supercritical fluid dyeing of polymer material, so that preheating, foaming and dyeing operations can be completed at different process stages in one device, i.e. the foaming and dyeing kettle, and a microcellular foamed product with accurate size, fine foam and controllable hardness can be obtained, while dyeing of the foamed product can be carried out at the same time; and the production line is simple in structure, reasonable in design, comprehensive in function, convenient to operate, high in production efficiency, good in product quality and low in cost.

2. The production line of the invention allows flexible operations, and can carry out both dyeing and foaming operations, only foaming operation or only dyeing operation on polymer material.

3. According to the production method of the invention, one-step foaming and supercritical fluid dyeing are integrated, so that preheating, foaming and dyeing operations can be completed at different process stages in one device, i.e. the foaming and dyeing kettle, thereby solving the problems that at present, polymer material foaming is generally carried out in multiple steps of preheating and foaming, which leads to system complexity, cumbersome operation, time consumption, high cost, etc., while a dyeing function is not provided.

DETAILED DESCRIPTION

Embodiment 1

Figure 1:
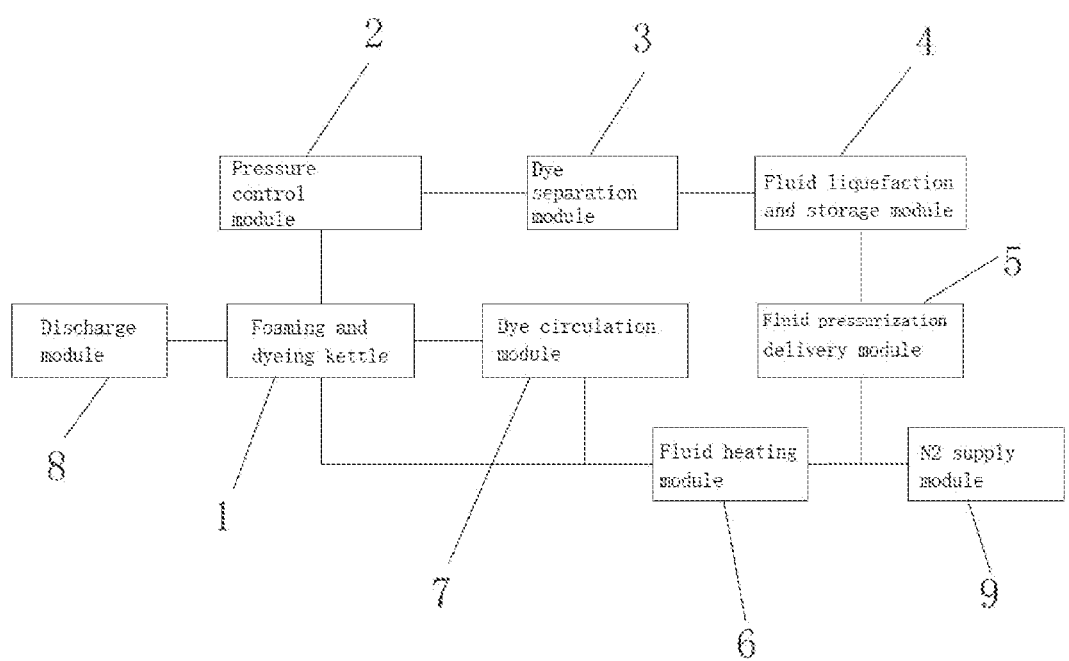
FIG. 1 is a block diagram of a foaming and dyeing integrated production line for a polymeric material product.

Referring to FIG. 1, the Embodiment 1 of the present invention provides a foaming and dyeing integrated production line for a polymer material product, comprising a foaming and dyeing kettle 1 for foaming and/or dyeing, a pressure control module 2 for controlling operation pressure of the foaming and dyeing kettle 1, a dye separation module 3 for separating $CO_2$ from dye remaining after dyeing, a fluid liquefaction and storage module 4 for liquefying and storing $CO_2$, a fluid pressurization delivery module 5 for pressurizing $CO_2$, a fluid heating module 6 for heating $CO_2$, and a dyeing circulation module 7 for circularly delivering dye in cooperation with $CO_2$ to the foaming and dyeing kettle 1 for dyeing; the pressure control module 2 is connected to a first fluid outlet of the foaming and dyeing kettle 1, the dye separation module 3 is connected between the pressure control module 2 and the fluid liquefaction and storage module 4, the fluid pressurization delivery module 5 is connected between the fluid liquefaction and storage module 4 and the fluid heating module 6, the fluid heating module 6 is connected to both a fluid inlet of the foaming and dyeing kettle 1 and the dyeing circulation module 7, and the dyeing circulation module 7 is connected to both the fluid inlet of the foaming and dyeing kettle 1 and a second fluid outlet of the foaming and dyeing kettle 1.

As a further improvement of this embodiment, according to the need, the production line may further comprise a discharge module 8 for reducing noise during pressure release and discharging of a high-pressure fluid after foaming, and the discharge module 8 is connected to the first fluid outlet of the foaming and dyeing kettle 1.

As a yet further improvement of this embodiment, according to the need, the production line may further comprise a $N_2$ supply module 9 for providing $N_2$ during foaming operation, and an outlet end of the $N_2$ supply module 9 is connected between the fluid pressurization delivery module 5 and the fluid heating module 6.

The Embodiment 1 provides a foaming and dyeing integrated production method for a polymer material product, comprising the following steps:

(1) material loading: a polymer material preform is put into the foaming and dyeing kettle 1, and a dye for dyeing is loaded into the dyeing circulation module 7;

(2) supercritical fluid dyeing: $CO_2$ from the fluid liquefaction and storage module 4 is gasified sequenctially through pressurization in the fluid pressurization delivery module 5 and heating in the fluid heating module 6 and is injected into the foaming and dyeing kettle 1, pressurization is stopped when the $CO_2$ reaches a supercritical state meeting requirements of a dyeing process, then the dyeing circulation module 7 is started to begin a dyeing circulation process in which the $CO_2$ in the supercritical state enters the dyeing circulation module 7 and dissolves the dye in the dyeing circulation module 7, the $CO_2$ carrying the dye returns to the foaming and dyeing kettle 1 to dye the polymer material preform in the foaming and dyeing kettle 1 a desired color, when dyeing requirements are met, the $CO_2$ flows out of the foaming and dyeing kettle 1 and is subjected to pressure release in the pressure control module 2, the $CO_2$ is separated from the dye remaining after dyeing in the dye separation module 3, and the $CO_2$ with the dye separated enters the fluid liquefaction and storage module 4 to be liquefied and stored;

(3) one-step foaming: when the dyeing process is finished, $CO_2$ and/or $N_2$ pressurized in the fluid pressurization delivery module 5 and heated in the fluid heating module 6 is injected into the foaming and dyeing kettle 1 according to a proportion of fluid required for foaming, and pressurization is stopped and foaming operation is started when requirements of a foaming process are met; and (4) unloading: when the foaming process is finished, the foaming and dyeing kettle 1 is opened, and a foamed and dyed polymer material product in the foaming and dyeing kettle 1 is taken out.

Among others, the polymer material preform may comprise, but is not limited to, a sheet, granular or three-dimensional object made of any one of polyethylene, polylactic acid, polypropylene, polystyrene, polymethyl methacrylate, polycarbonate, acrylonitrile-butadiene-styrene copolymer, polyethylene terephthalate, polyamide, polyimide, polyphenylene sulfide, polyether sulfone, polyether ether ketone, rubber, silicone rubber, ethylene propylene diene monomer, ethylene-vinyl acetate copolymer, thermoplastic polyurethane, thermoplastic elastomer, or a combination thereof.

The dye may comprise, but is not limited to, any one of a disperse dye, an azoic dye, a cationic dye, a reactive dye, an acid dye, a condensation dye, or a combination of.

Depending on material of the polymer material product, temperatures for dyeing and foaming are individually controlled between 60° C. and 200° C., pressures for dyeing and foaming are individually controlled between 10 MPa and 35 MPa, and times for dyeing and foaming are individually controlled between 40 minutes and 180 minutes.

Depending on material of the polymer material product, the fluid for dyeing and foaming may be any one of $CO_2$, $N_2$ or a mixture of the two according to a ratio.

Depending on the foaming requirements, the combination of the fluid described above may be repeated for multiple times in a single foaming process according to different schemes.

According to the need, polymer material may be subjected to both dyeing and foaming operations, only foaming operation or only dyeing operation.

Embodiment 2

Figure 2:
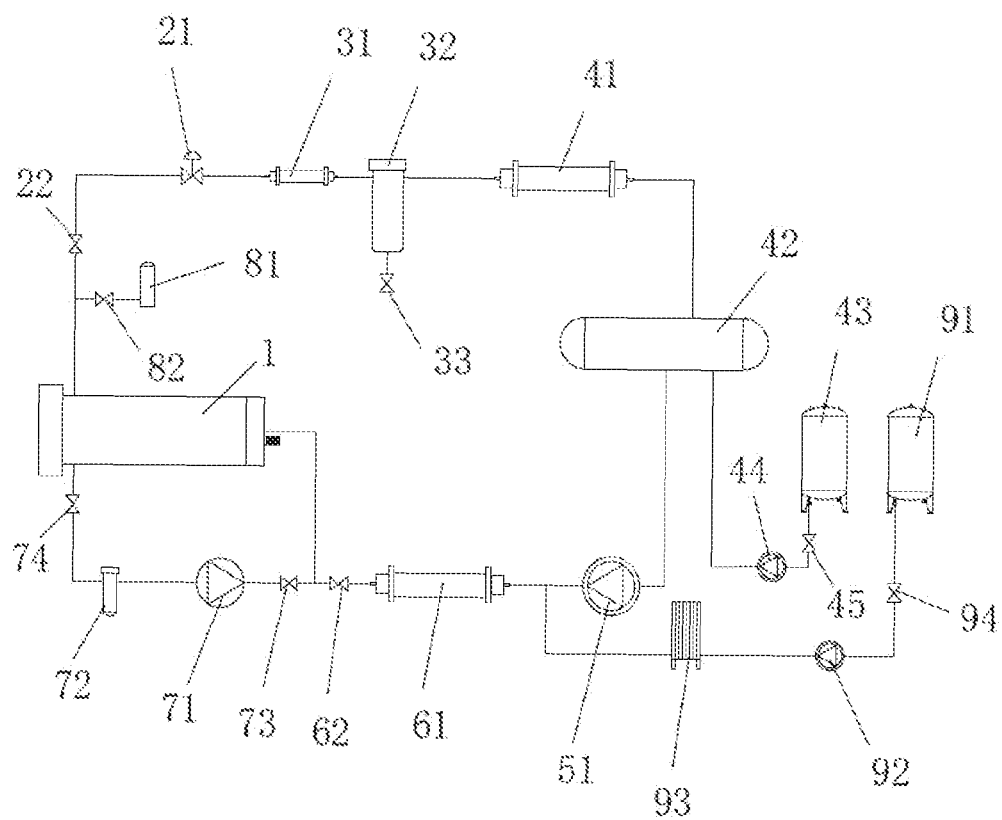
FIG. 2 is a schematic view showing the structure of a foaming and dyeing integrated production line for a polymer material product.
Figure 3:
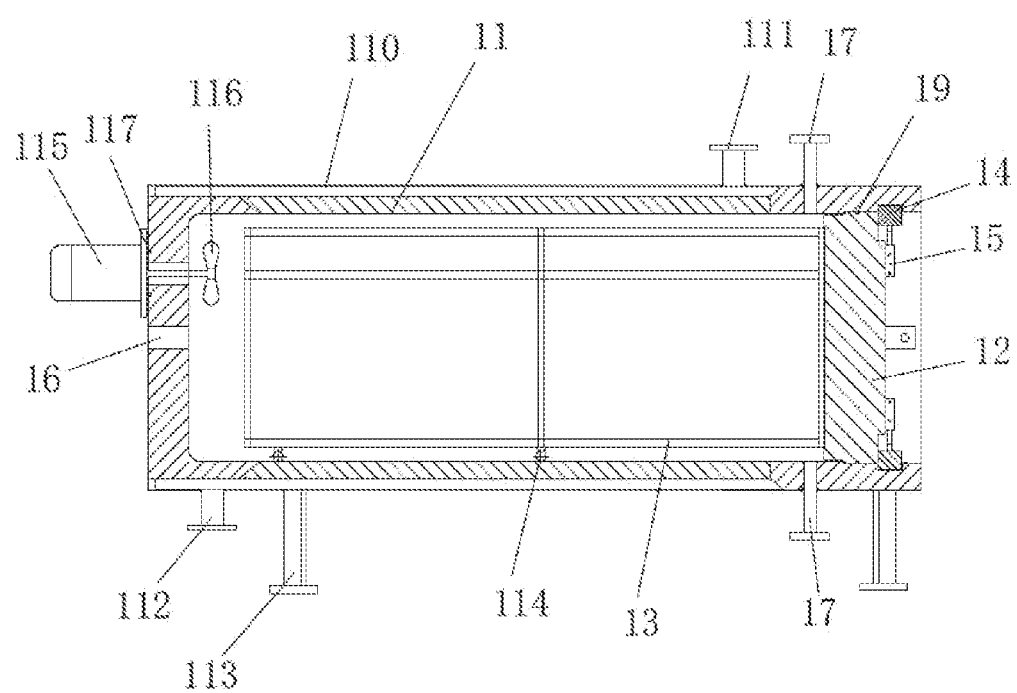
FIG. 3 is a sectional view of a foaming and dyeing kettle.

The Embodiment 2 of the invention provides a foaming and dyeing integrated production line for a polymer material product, which also comprises the following as in the Embodiment 1: a foaming and dyeing kettle 1 for foaming and/or dyeing, a pressure control module 2 for controlling operation pressure of the foaming and dyeing kettle 1, a dye separation module 3 for separating $CO_2$ from dye remaining after dyeing, a fluid liquefaction and storage module 4 for liquefying and storing $CO_2$, a fluid pressurization delivery module 5 for pressurizing $CO_2$, a fluid heating module 6 for heating $CO_2$, and a dyeing circulation module 7 for circularly delivering dye in cooperation with $CO_2$ to the foaming and dyeing kettle 1 for dyeing. On the basis of the Embodiment 1, the various parts of the production line in the Embodiment 2 are improved as follows:

as shown in FIGS. 2 and 3, the foaming and dyeing kettle 1 is the main equipment of the production line and is a horizontal autoclave; specifically, the foaming and dyeing kettle 1 may comprise a kettle body 11, a lid 12, an agitator driver 115 and an agitator paddle 116, the kettle body 11 is horizontally arranged so as to facilitate loading, cleaning or other operations of materials, the kettle body 11 has a hollow interior, and one end of the kettle body 11 is opened to form an open end, while the other end of the kettle body 11 is closed to form a closed end. Moreover, the kettle body 11 is provided with a fluid inlet 16 and two fluid outlets 17 each in communication with the interior of the kettle body 11, the fluid inlet 16 may be formed in the closed end of the kettle body 11, and the fluid outlets 17 may be formed in the top and/or the bottom of the kettle body 11 and close to the open end of the kettle body 11.

The agitator driver 115 is axially installed at the closed end of the kettle body 11, an agitator shaft of the agitator driver 115 penetrates through the kettle body 11 and extends into the kettle body 11, the agitator shaft of the agitator driver 115 is connected to the agitator paddle 116 inside the kettle body 11, and the agitator driver 115 is capable of driving the agitator paddle 116 to rotate. In this embodiment, the agitator driver 115 may preferably be provided as a magnetic agitator. The agitator driver is capable of driving the agitator paddle to rotate, and the fluid in the kettle body is driven to develop convective circulation to enhance convective heat transfer and improve the uniformity of temperature distribution in the kettle body, so that the temperature at every position in the kettle body tends to be same, the consistency of the shape and parameters of the foamed product is guaranteed, and the yield of products is improved.

As the agitator shaft of the agitator driver 115 needs to penetrate through a hole in the kettle body 11, the space between the agitator driver 115 and the closed end of the kettle body 11 needs to be sealed with a first sealing ring 117 to achieve self-energizing sealing.

Preferably, the agitator driver 115 is eccentrically installed relative to the axis of the kettle body 11. Among others, the eccentric installation of the agitator driver relative to the axis of the kettle body enables the agitator paddle to be more effective in promoting the fluid in the kettle body to develop convective currents.

As shown in FIG. 3, the lid 12 is installed inside the open end of the kettle body 11 in a sealed manner and is capable of closing the opening of the kettle body 11, wherein an O-shaped second sealing ring 19 is arranged between the lid 12 and the inner wall of the kettle body 11, and the lid 12 may be sealed with the kettle body 11 with the second sealing ring 19 to achieve high-pressure self-tightening sealing.

As shown in FIG. 3, a material holder 13 is arranged inside the kettle body 11, one end of the material holder 13 is fixedly connected to an inner end of the lid 12, and the material holder 13 is configured to have a frame structure for loading or hanging materials, wherein the lid is connected to the material holder to form an integrated structure such that the coming in/out of the material holder and the opening/closing of the lid are combined, therefore, the lid only needs to move in one direction, i.e., the axial direction, and when opened, does not need to move radially to avoid the material holder which is moving in/out, thereby simplifying the opening of the lid, and saving the space for operation.

Preferably, the bottom of the material holder 13 may further be provided with guide wheels 114 to facilitate the moving in/out of the material holder 13.

As shown in FIG. 3, an insulation jacket 110 may be arranged outside the kettle body 11, an insulation interlayer is formed between the insulation jacket 110 and the kettle body 11, and an insulation inlet 111 and an insulation medium outlet 112 which are in communication with the insulation interlayer are formed in the insulation jacket 110. Preferably, the insulation medium inlet 111 may be provided at the top of one end of the kettle body 11, the insulation medium outlet 112 may be provided at the bottom of the other end of the kettle body 11, and the insulation medium may be hot water, hot oil, etc.

Moreover, a support 113 for supporting the entire foaming autoclave may be provided outside the insulation jacket 110.

As shown in FIG. 3, the lid may be locked and unlocked with the kettle body by means of a wedge-type quick-open locking mechanism, the wedge-type quick-opening locking mechanism may comprise a wedge driving device 15 and a wedge 14, the wedge driving device 15 is installed at an outer end of the lid 12, and the wedge driving device 15 is in transmission connection with the wedge 14. A groove 18 for snap-in fit with the wedge 14 is formed in the inner wall of the open end of the kettle body 11.

In this embodiment, there may be preferably five wedges 14 and five wedge driving device 15, each wedge 14 may be configured to be arc shaped and the five wedges 14 may be combined to form an annular structure; correspondingly, the grooves 18 of the kettle body 11 may also be configured to form an annular shape matching with the wedges. The combined wedge structure provides a good locking effect. In actual implementation, the wedge driving device 15 may preferably be provided as a cylinder.

After the lid is pushed into the open end of the kettle body 11, the wedge driving devices 15 can drive the respective corresponding wedges 14 to move radially, so that the wedges 14 can be snapped into the grooves 18 of the kettle body 11 so as to lock the lid 12. When the lid is to be opened, the wedge driving devices 15 can drive the wedges 14 to leave the grooves 18 of the kettle body 11.

The lid of the foaming autoclave is installed inside the open end (i.e. at an inner diameter position) of the kettle body, and compared with an autoclave having an hoop type opening structure, the lid is not required to have the same outer diameter as the kettle body, so that the size of the lid is greatly reduced, and the weight is light; besides, in the wedge-type quick-open locking mechanism, the wedge driving devices can drive the respective corresponding wedges to move radially to allow the wedges to be snapped into the grooves in the inner wall of the open end of the kettle body 11 so as to lock the lid, or allow the wedges to leave the grooves of the kettle body to open the lid, so that the mechanism is simple and compact in structure and reasonable in design, provides reliable sealing, and simplifies and facilitates the opening and closing of the lid; moreover, the mechanism is mounted along with the lid in the open end of the kettle bod, so that the installation space is saved.

As shown in FIG. 2, the pressure control module 2 may comprise an automatic pressure regulator valve 21, a first switch valve 22 is arranged between an inlet end of the automatic pressure regulator valve 21 and the first fluid outlet of the foaming and dyeing kettle 1, and an outlet end of the automatic pressure regulator valve 21 is connected to the dye separation module 3. The automatic pressure regulator valve 21 can control the operation pressure of the foaming and dyeing kettle according to requirements process.

As shown in FIG. 2, the dye separation module 3 may comprise an evaporator 31 and a dye recovery and separation kettle 32, an inlet end of the evaporator 31 is connected to the pressure control module 21, an outlet end of the evaporator 31 is connected to an inlet end of the dye recovery and separation kettle 32, an outlet end of the dye recovery and separation kettle 32 is connected to the fluid liquefaction and storage module 4, and a second switch valve 33 is arranged at a recovery port of the dye recovery and separation kettle 32. Among others, the dye recovery and separation kettle may be provided as a quick-open high-pressure container to recover dye remaining after the dyeing process.

As shown in FIG. 2, the fluid liquefaction and storage module 4 may comprise a condenser 41, a $CO_2$ circulating storage tank 42, a $CO_2$ replenishing storage tank 43 and a $CO_2$ delivery pump 44, an inlet end of the condenser 41 is connected to the dye recovery and separation kettle 32, an outlet end of the condenser 41 is connected to an inlet end of the $CO_2$ circulating storage tank 42, an outlet end of the $CO_2$ circulating storage tank 42 is connected to the fluid pressurization delivery module 5, the $CO_2$ delivery pump 44 is connected between an outlet end of the $CO_2$ replenishing storage tank 43 and a fluid replenishing port of the $CO_2$ circulating storage tank 42, and a third switch valve 45 is arranged between the $CO_2$ delivery pump 44 and the $CO_2$ replenishing storage tank 43.

Among others, the condenser 41 may be provided as a tube-sheet heat exchanger, which functions to cool and liquefy $CO_2$ gas separated by the dye separation and recovery kettle into a liquid state for storage in the $CO_2$ circulating storage tank. The $CO_2$ replenishing storage tank stores liquid $CO_2$ to replenish the $CO_2$ circulating storage tank. With the operation of the production line, the $CO_2$ may be consumed, and when the amount of liquid $CO_2$ stored in the $CO_2$ circulating storage tank is below a specified value, it needs the $CO_2$ replenishing storage tank to replenish the $CO_2$ circulating storage tank.

As shown in FIG. 2, the fluid pressurization delivery module 5 may comprise a $CO_2$ high-pressure pump 51, an inlet end of the $CO_2$ high-pressure pump 51 is connected to an outlet end of the $CO_2$ circulating storage tank 42, and an outlet end of the $CO_2$ high-pressure pump 51 is connected to the fluid heating module 6.

As shown in FIG. 2, the fluid heating module 6 may comprise a heater 61, an inlet end of the heater 61 is connected to an outlet end of the $CO_2$ high-pressure pump 51, a fourth switch valve 62 is arranged at an outlet end of the heater 61, and an outlet end of the fourth switch valve 62 is connected to both a fluid inlet of the foaming and dyeing kettle 1 and the dyeing circulation module 7. The heater 61 is capable of heating $CO_2$ and $N_2$ fluids.

As shown in FIG. 2, the dyeing circulation module 7 may comprise a dyeing circulation pump 71 and a dye kettle 72 a fifth switch valve 73 is arranged between an outlet end of the dyeing circulation pump 71 and a fluid inlet of the foaming and dyeing kettle 1, an outlet end of the dye kettle 72 is connected to an inlet end of the dyeing circulation pump 71, and a sixth switch valve 74 is arranged between an inlet end of the dye kettle 72 and the second fluid outlet of the foaming and dyeing kettle 1. The dye kettle 72 stores therein dye for dyeing operation.

As shown in FIG. 2, the discharge module 8 may comprise a silencer 81 and an eighth switch valve 82, and the eighth switch valve 82 is connected between the silencer 81 and the first fluid outlet of the foaming and dyeing kettle 1.

As shown in FIG. 2, the $N_2$ supply module 9 may comprise a $N_2$ storage tank 91, a $N_2$ high-pressure pump 92 and a vaporizer 93, a seventh switch valve 94 is arranged between an outlet end of the $N_2$ storage tank 91 and an inlet end of the $N_2$ high-pressure pump 92, an inlet end of the vaporizer 93 is connected to an outlet end of the $N_2$ high-pressure pump 92, and an outlet end of the vaporizer 93 is connected between the $CO_2$ high-pressure pump 51 and the heater 61. The $N_2$ storage tank 91 stores liquid $N_2$ for foaming operation.

The Embodiment 2 provides a foaming and dyeing integrated production method for a polymer material product, comprising the following steps:

(1) material loading: a polymer material preform is put into the foaming and dyeing kettle 1, and a dye for dyeing is loaded into the dye kettle 72;

(2) supercritical fluid dyeing: after material loading is finished, the first switch valve 22, the sixth switch valve 74 and the eighth switch valve 82 are closed, the fourth switch valve 62 is opened, the $CO_2$ high-pressure pump 51 is started, liquid $CO_2$ in the $CO_2$ circulating storage tank 42 is gasified sequentially through pressurization in the $CO_2$ high-pressure pump 51 and heating in the heater 61 and is injected into the foaming and dyeing kettle 1, the pressure in the foaming and dyeing kettle 1 is gradually increased, and pressurization is stopped when the $CO_2$ reaches a supercritical state meeting requirements of a dyeing process (i.e. the pressure and temperature reach preset values); the fourth switch valve 62 is closed and the fifth switch valve 73 and the sixth switch valve 74 are opened such that the foaming and dyeing kettle 1 is in communication with the dye kettle 72 and the dyeing circulation pump 71 to begin a dyeing circulation process in which the $CO_2$ in the supercritical state enters the dyeing circulation module 7 and dissolves the dye in the dyeing circulation module 7, the $CO_2$ carrying the dye returns to the foaming and dyeing kettle 1 to dye the polymer material preform in the foaming and dyeing kettle 1 a desired color; when dyeing requirements are met, the fifth switch valve 73 and the sixth switch valve 74 are closed, the first switch valve 22 is opened, the $CO_2$ flows out of the foaming and dyeing kettle 1 and is subjected to pressure release via the automatic pressure regulator valve 21 and then heated in the evaporator 31 and enters the dye recovery and separation kettle 32, the $CO_2$ is separated from the dye remaining after dyeing and the dye is recovered via the second switch valve 33, the $CO_2$ with the dye separated enters the condenser 41 to be cooled and liquefied, the liquefied $CO_2$ enters the $CO_2$ circulating storage tank 42 to be stored for subsequent use;

(3) one-step foaming: when the dyeing process is finished, the first switch valve 22 and the eighth switch valve 82 are closed, $CO_2$ and $N_2$ are pressurized and injected according to a proportion of fluid required by foaming, in which the $CO_2$ comes from $CO_2$ in the $CO_2$ circulating storage tank 42 which is pressurized and injected via the $CO_2$ high-pressure pump 51, and the $N_2$ comes from liquid $N_2$ in the $N_2$ storage tank 91 which is pressurized and output via the $N_2$ high-pressure pump 92 and is injected after being gasified by the vaporizer 93; the $CO_2$ and $N_2$ are heated via the heater to meet the requirements of the foaming process, pressurization is stopped when the fluid pressure also meets the requirements, and the foaming operation is started; in the foaming process, the agitator driver 115 of the foaming and dyeing kettle 1 is started to enhance the convection of fluid in the kettle and make the temperature in the kettle uniform, and according to the requirements of different materials, the foaming process may be carried out using $CO_2$ and $N_2$ in multiple combinations alternatively in the foaming operation; and after the foaming operation is finished, the eighth switch valve 82 is opened, and the high-pressure fluid is released and discharged through the silencer 81.

(4) unloading: when the foaming process is finished, the foaming and dyeing kettle 1 is opened, and a foamed and dyed polymer material product in the foaming and dyeing kettle 1 is taken out.

The above-described embodiments are preferred embodiments of the present invention, but the embodiments of the present invention are not limited to the above-described embodiments, and any other changes, modifications, substitutions, combinations, simplifications, which do not depart from the spirit and principles of the present invention are intended to be equivalent and fall within the scope of the present invention.

The invention claimed is:

1. A foaming and dyeing integrated production line for a polymer material product, comprising a foaming and dyeing kettle for foaming and/or dyeing, a pressure control module for controlling operation pressure of the foaming and dyeing kettle, a dye separation module for separating $CO_2$ from dye remaining after dyeing, a fluid liquefaction and storage module for liquefying and storing $CO_2$, a fluid pressurization delivery module for pressurizing $CO_2$, a fluid heating module for heating $CO_2$, and a dyeing circulation module for circularly delivering dye in cooperation with $CO_2$ to the foaming and dyeing kettle for dyeing; the pressure control module is connected to a first fluid outlet of the foaming and dyeing kettle, the dye separation module is connected between the pressure control module and the fluid liquefaction and storage module, the fluid pressurization delivery module is connected between the fluid liquefaction and storage module and the fluid heating module, the fluid heating module is connected to both a fluid inlet of the foaming and dyeing kettle and the dyeing circulation module, and the dyeing circulation module is connected to both the fluid inlet of the foaming and dyeing kettle and a second fluid outlet of the foaming and dyeing kettle.

2. The foaming and dyeing integrated production line for the polymer material product of claim 1, wherein the foaming and dyeing kettle comprises a kettle body, a lid, an agitator driver and an agitator paddle, the kettle body is horizontally arranged, the lid is installed inside an open end of the kettle body in a sealed manner, the agitator driver is axially installed at a closed end of the kettle body, an agitator shaft of the agitator driver penetrates through the kettle body and extends into the kettle body, the agitator shaft is connected to the agitator paddle inside the kettle body, and the lid is locked and unlocked with the kettle body by means of a wedge-type quick-open locking mechanism.

3. The foaming and dyeing integrated production line for the polymer material product of claim 1, wherein the pressure control module comprises an automatic pressure regulator valve, a first switch valve is arranged between an inlet end of the automatic pressure regulator valve and the first fluid outlet of the foaming and dyeing kettle, and an outlet end of the automatic pressure regulator valve is connected to the dye separation module.

4. The foaming and dyeing integrated production line for the polymer material product of claim 1, wherein the dye separation module comprises an evaporator and a dye recovery and separation kettle, an inlet end of the evaporator is connected to the pressure control module, an outlet end of the evaporator is connected to an inlet end of the dye recovery and separation kettle, an outlet end of the dye recovery and separation kettle is connected to the fluid liquefaction and storage module, and a second switch valve is arranged at a recovery port of the dye recovery and separation kettle.

5. The foaming and dyeing integrated production line for the polymer material product of claim 1, wherein the production line further comprises a discharge module for reducing noise during pressure release and discharging a pressurized fluid after foaming, the discharge module is connected to the first fluid outlet of the foaming and dyeing kettle, the discharge module comprises a silencer and an eighth switch valve, and the eighth switch valve is connected between the silencer and the first fluid outlet of the foaming and dyeing kettle.

6. The foaming and dyeing integrated production line for the polymer material product of claim 1, wherein the fluid liquefaction and storage module comprises a condenser, a $CO_2$ circulating storage tank, a $CO_2$ replenishing storage tank and a $CO_2$ delivery pump, an inlet end of the condenser is connected to the dye separation module, an outlet end of the condenser is connected to an inlet end of the $CO_2$ circulating storage tank, an outlet end of the $CO_2$ circulating storage tank is connected to the fluid pressurization delivery module; the $CO_2$ delivery pump is connected between an outlet end of the $CO_2$ replenishing storage tank and a fluid replenishing port of the $CO_2$ circulating storage tank, and a third switch valve is arranged between the $CO_2$ delivery pump and the $CO_2$ replenishing storage tank.

7. The foaming and dyeing integrated production line for the polymer material product of claim 1, wherein the fluid pressurization delivery module comprises a $CO_2$ pressurized pump, an inlet end of the $CO_2$ pressurized pump is connected to an outlet end of the fluid liquefaction and storage module, and an outlet end of the $CO_2$ pressurized pump is connected to the fluid heating module.

8. The foaming and dyeing integrated production line for the polymer material product of claim 1, wherein the fluid heating module comprises a heater, a fourth switch valve is arranged at an outlet end of the heater, and an outlet end of the fourth switch valve is connected to both the fluid inlet of the foaming and dyeing kettle and the dyeing circulation module.

9. The foaming and dyeing integrated production line for the polymer material product of claim 1, wherein the dyeing circulation module comprises a dyeing circulation pump and a dye kettle, a fifth switch valve is arranged between an outlet end of the dyeing circulation pump and a fluid inlet of the foaming and dyeing kettle, an outlet end of the dye kettle is connected to an inlet end of the dyeing circulation pump, and a sixth switch valve is arranged between an inlet end of the dye kettle and the second fluid outlet of the foaming and dyeing kettle.

10. The foaming and dyeing integrated production line for the polymer material product of claim 1, wherein the production line further comprises a $N_2$ supply module for providing $N_2$ during foaming operation, an outlet end of the $N_2$ supply module is connected between the fluid pressurization delivery module and the fluid heating module, the $N_2$ supply module comprises a $N_2$ storage tank, a $N_2$ pressurized pump and a vaporizer, a seventh switch valve is arranged between an outlet end of the $N_2$ storage tank and an inlet end of the $N_2$ pressurized pump, an inlet end of the vaporizer is connected to an outlet end of the $N_2$ pressurized pump, and an outlet end of the vaporizer is connected between the fluid pressurization delivery module and the fluid heating module.

* * * * *